Patented Jan. 4, 1938

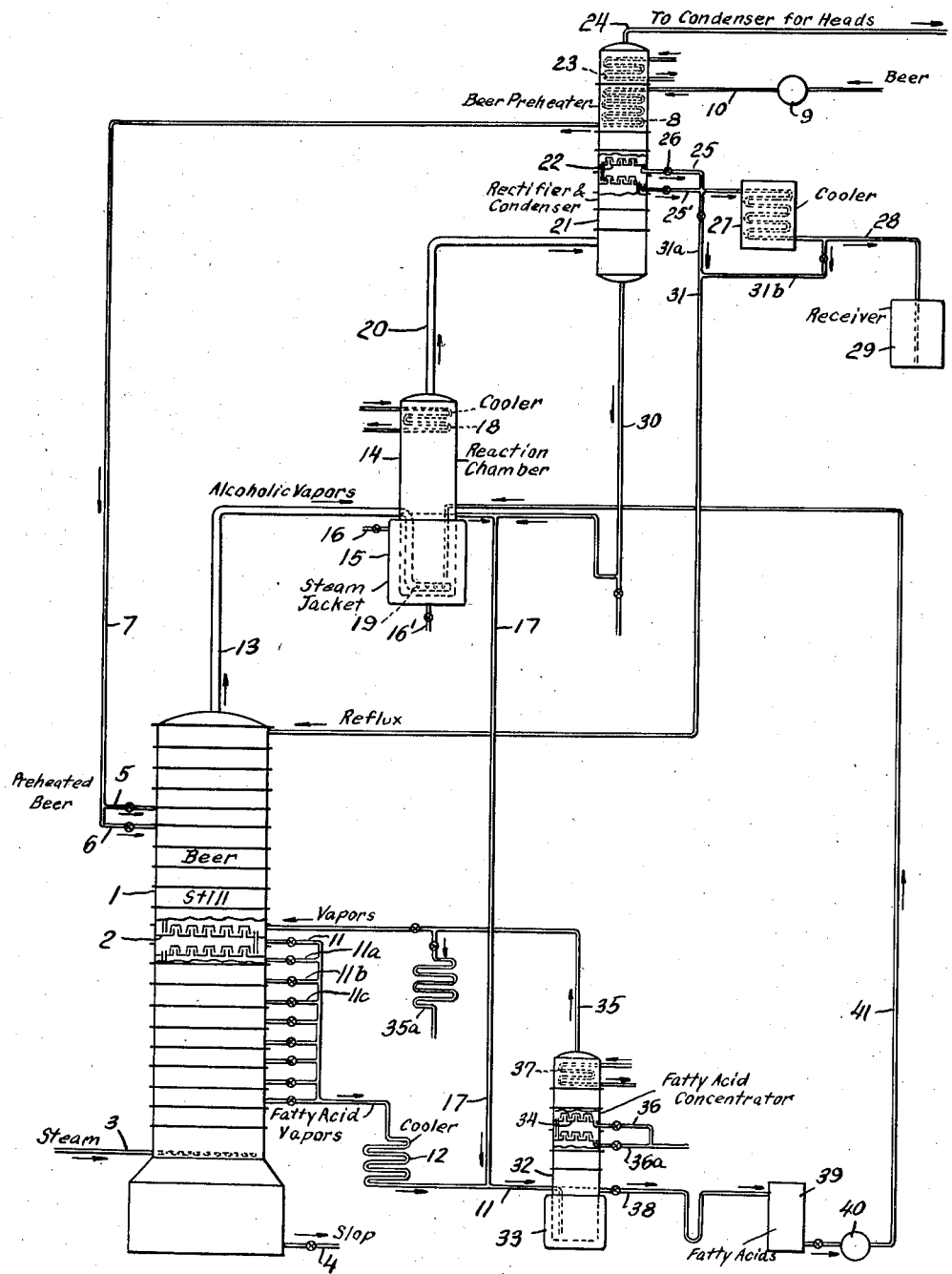

2,104,243

UNITED STATES PATENT OFFICE 2,104,243

PROCESS FOR MANUFACTURE OF SPIRITUOUS LIQUORS

Frederick Garthewaite Ring, Newark, N. J., assignor to Semet-Solvay Engineering Corporation, New York, N. Y., a corporation of New York Application May 26, 1934, Serial No. 727,616

4 Claims. (Cl. 99—48)

This invention relates to the production of spirituous liquors of improved flavor, body, and aroma. In the manufacture of alcoholic liquors, such as whiskey, brandy, rum, etc., it was at one time common to effect distillation of the liquors resulting from fermentation of the mash or wort etc., hereinafter referred to as "beer", in a socalled "pot-still", a simple distillation apparatus wherein the beer was heated by the direct action of the fire or by steam. Distilled liquors obtained by this method were highly flavored and possessed an agreeable taste and smell.

In more recent years the old distillation apparatus has been replaced by continuous column stills or similar apparatus to a large extent in order to obtain improved heat economies and more complete separation of alcoholic distillate from the beer. The substitution of these new types of apparatus for the old has been found, however, to yield products possessing low body and having a poorer flavor and aroma than products formerly produced.

In accordance with the present invention I have found that by suitable regulation or alteration of the distillation procedure, as hereinafter more fully described, not only may spirituous liquors of improved body, flavor, and aroma be obtained, but products may be produced possessing these qualities to an even greater extent than those resulting from the operation of the less used pot stills. Furthermore, the products of my improved process require a substantially reduced period of time for aging, since they already possess to a very material extent upon their recovery from the distillation the qualities desired in the final product.

In accordance with the present process, which is applicable to any continuous distillation such as the column still distillation of fermented mashes, a small part of the vapors is withdrawn from the distillation system at a point where the vapors contain relatively large proportions of aliphatic acids, particularly acids containing less than eleven carbon atoms in the acid molecule. This portion of vapors after withdrawal from the still is concentrated by fractional distillation or fractional condensation to give a product in which the desired aliphatic acids are present in very materially increased concentration. This concentrate is then introduced into the distillation system at a point where it comes into contact with relatively concentrated alcoholic distillate at an elevated temperature whereby reaction between the alcohol and acids takes place yielding esters which in the final product greatly improve its body, aroma, and flavor. In prior art distillation processes of the continuous type some acetic acid was at times carried over with the vapors but when this occurred the acid was in relatively dilute form and contact was not necessarily of long duration. The less volatile acids on the other hand did not have any chance to contact with or react with the alcoholic vapors.

In column still operations it is only necessary to withdraw a small portion of vapors at a point in the column where the vapors possess a relatively high acid concentration as compared with the vapors at other points in the system. The vapors withdrawn may, upon subsequent condensation, be equal in amount to 10% to 15% of the distilled spirits produced. Such vapors normally contain a relatively low percentage of alcohol as compared with that which favors esterification; hence the vapors may be removed from the column, condensed, and transferred to a concentrating still either of continuous or batch type wherein the major portion of the total liquid volume is distilled off. The residue from this distillation will contain the fatty acids desired, that is, those aliphatic acids containing two to eleven carbon atoms in the molecule, in a high degree of concentration. This residue may be introduced into the distilling column or distilling system at a point where the vapors and liquors possess a much higher alcohol concentration than at the point from which the acids were removed.

Preferably I effect the association and reaction of acids with alcohol by effecting repeated distillation and condensation of the relatively concentrated alcoholic distillate containing for instance on the order of 40% to 70% ethyl alcohol in the presence of the free fatty acid concentrate. Since this concentrate is composed in a large measure of fatty acids, the total water content of the liquid and vapors during the reaction is relatively low, not more than about 60% of the total mixture. Furthermore the acids are not merely the more volatile acids such as acetic but include the acids containing from four to eleven carbon atoms in the molecule. It is these latter acids whose presence is especially desired but which are absent in the usual distilled products.

A convenient type of reaction chamber for bringing acids into association with the alcoholic distillate comprises a boiler or distillation vessel heated externally by a steam jacket and so arranged that the strongly alcoholic vapors bubble up through a body of liquid containing the fatty acids and then pass into contact with a cooling medium whereupon a part of the vapors are condensed and returned to the body of liquid through which the strongly alcoholic vapors pass. It is preferred that this cooling of the vapors should effect the condensation of only a portion of the vapors without a great deal of rectification, in order that a high concentration of alcohol may be maintained.

The drawing illustrates diagrammatically apparatus for carrying out the preferred embodiment of my invention. In the drawing numeral 1 designates a continuous column still provided with a series of sections 2 which may be superimposed bubble trays of any of the well-known types. A perforated steam pipe 3 is provided for supplying steam to the column still. A draw-off 4 is provided for removing distillation residue, "slops", from the still. The column still 1 is arranged to receive beer through either or both of branches 5 and 6 of pipe line 7 from preheater 8. A pump 9 supplies the beer to the preheater through pipe line 10. The column 1 also has valved vapor outlets 11, 11a, 11b, 11c, etc. conducting to the cooler 12 and adapted for the regulated withdrawal of vapor as hereinafter more fully described. At the top of column 1 is a vapor outlet 13 leading to the reaction chamber 14.

This reaction chamber 14 is in substance a still equipped with a reflux condenser. The lower portion of the chamber constitutes the still. It is provided with a steam jacket 15, having steam inlet 16 and water outlet 16', for heating liquid therein. A liquid outlet or overflow pipe 17 is arranged for removal of liquid from the top of the body of liquid contained in the chamber, and a supply pipe 41 is arranged for introduction of fatty acids into the bottom of the chamber. In the upper part of the chamber there is provided a cooling coil 18 for partially cooling and condensing vapors to return a portion of the distillate to the still. Pipe 13 projects substantially to the bottom of the chamber 14 and is provided with perforations 19 so that vapors passing therethrough bubble up through the body of liquid in the reaction chamber. Vapor outlet 20 is arranged to conduct vapors from the top of the partial condenser into a rectifying column 21.

This rectifying column is of the usual type of fractionating column with a heat exchanger 8 located in the upper portion through which the beer is passed as a cooling medium enroute to the still 1. Additional cooling means 23 for condensing vapors in the rectifying column may be provided for regulating the cooling in rectifier 21. A vapor outlet 24 is provided at the top of the column for conveying vapors of aldehydes or other heads to a condenser (not shown). Liquid draw-offs 25 and 25' each having a suitable control valve 26 are arranged for withdrawal of the high alcoholic potable distillate to a cooler 27. This cooler, which may be water-cooled, is connected by pipe 28 to receiver 29. A pipe 30 connects the bottom of rectifier 21 with the pipe 17 whereby reflux from the rectifier 21 may be transferred to still 32. A return pipe 31 with valved branches 31a and 31b is provided for returning a portion of the liquor recovered either before or after cooling in cooler 27 to the top of still 1 to serve as reflux in the section of this column above the beer inlet.

As previously mentioned in connection with column 1, an outlet pipe 11 and pipes 11a, 11b, 11c, etc. are provided for withdrawal of a part of the vapors produced in column 1. Outlet 11 leads through a condenser 12 and is joined by pipe 17 from the reaction chamber 14. Pipe 11 leads to a distillation vessel 32 which may be heated indirectly by means of a steam jacket 33 at the bottom and has fractionating plates 34 in the upper portion thereof. A vapor outlet 35 leads from the top of this distillation vessel to column 1 or the vapors may be condensed and withdrawn through pipe 35a if desired. Liquid withdrawal outlets 36, 36a, etc. are provided for the withdrawal of a portion of the condensate collecting on plates or trays 34. A cooling coil 37 is provided to cool and partly condense the vapors and thus supply reflux liquid to these trays. The balance of condensate which is not withdrawn at 36, 36a, and which is not revaporized, returns to the still. Overflow pipe 38 for the removal of liquid from the top of the body of liquid in distillation chamber 32 is provided. This pipe leads to a storage tank 39. Tank 39 together with a pump 40 are arranged to supply liquid through pipe 41 to the bottom of reaction chamber 14.

The operation of this apparatus as applied to the manufacture of rye whiskey is as follows:

The beer (a rye mash fermented for 2 to 3 days in the customary manner) is supplied by pump 9 through preheater 8 through inlet 5 or 6 to column 1 and flows down therethrough from tray to tray. Steam is introduced through pipe 3 at the bottom of the fractionating section of column 1 to supply heat to the beer passing downwardly therethrough. The more volatile portions of the beer are thus vaporized and pass upwardly countercurrent to the liquid flow in the column. This countercurrent flow, as is well known, assists in separating more completely the various constituents of the beer. Distillation residue is withdrawn through outlet 4 at the bottom of the still. The vapors passing upwardly through the column above inlets 5 and 6 meet a descending stream of reflux condensate which is introduced through pipe 31, and are thus further rectified to an alcohol content of 50% to 60%. The rectified vapors leave the column at a temperature of about 92° or 93° C. They contain impurities such as aldehydes or "heads" and may also contain some of the lower fatty acids.

The concentrated vapors pass through pipe 13 into reaction chamber 14 and bubble up through the body of liquid maintained therein. This body of liquid comprises in addition to condensate formed by cooler 18 a fatty acid concentrate supplied through pipe 41. The vapors and concentrate are both introduced near the bottom of the reaction chamber and are brought immediately into intimate contact. Heat is supplied by means of steam jacket 15 so as to assist in esterifying the fatty acids and prevent undue cooling and condensation of the alcoholic vapors. The vapors carrying entrained and perhaps vaporized acids bubble up through the body of liquid and then come into contact with cooling coil 18. This coil is so arranged that it effects a partial condensation of the vapors. In order to maintain a high concentration of alcohol, fractionation is not encouraged. Condensate flows back into the body of liquid in the reaction chamber.

A part of the alcoholic vapors, including a considerable portion of the fatty acid esters formed in the reaction chamber 14, pass through cooler 18 without condensation and flow into fractionating column 21 where any heavy materials such as fatty acids are first separated by contact with reflux liquid flowing down through this column countercurrent to the vapors. After passage of the vapors through the rectifying section of this column they are brought into heat exchange relation with cold beer in preheater 8 and are thus cooled to form said reflux liquid. Liquid which reaches the bottom of column 21 is withdrawn through pipe 30 and since it ordinarily will contain a considerable concentration of fatty acids, it may be returned through pipe 17 to still 32. By the rectification in column 21, esters and alcohols are condensed and more volatile materials, such as aldehydes and other heads pass off through outlet 24 in vapor form. The degree of cooling and hence the quality of the fractionating that takes place in column 21 may be controlled by cooling coil 23 which serves as an auxiliary cooling unit to the beer preheater 8. The alcoholic fraction, which will contain 50% to 60% of alcohol and also the esters introduced by the fatty acid treatment, is withdrawn through outlet 25 or 25' to cooler 27 in which it is cooled prior to storage. Thereupon it is conveyed to receiver 29 and constitutes the final potable spirit of the present invention. A portion of this fraction either before or after cooling in cooler 27 is returned to still 1 to furnish reflux therein.

As previously mentioned, aliphatic acids are supplied by means of pipe 41 to reaction chamber 14. These aliphatic acids are obtained during the distillation process as follows: A portion of the vapors in the lower section of column 1 is gradually removed through one or more of the outlets 11, 11a, 11b, etc. at the point or points where the desired acids are at their maximum concentrations. This point normally will be low down in the column and in certain cases the more volatile of the desired acids may be withdrawn at a point above the less volatile ones. The particular location may vary depending upon the temperature and volume of steam employed. The vapors are condensed in cooler 12. Although vapors may be treated for concentrating acids without first condensing them, it is preferred for the sake of ease of manipulation to convey them as liquid to the concentrator 32. In addition to this source of fatty acids, reflux condensate obtained in reaction chamber 14 and which falls back onto the body of liquid in this reaction chamber and reflux liquid leaving rectifier 21 through pipe 30 are withdrawn gradually through pipe 17. These distillates, because of their high fatty acid content, are passed by means of pipe 11 into concentrator 32. Around 60% to 70% of the liquid introduced into this still is passed off in vapor form through pipe 35. By means of cooler 37 a portion of the vapors is condensed and collected on trays 34 to serve as reflux liquid for the vapors evolved. A portion of this condensate is gradually withdrawn through outlets 36, 36a, etc., the remainder being returned to the bottom of the still. The liquid withdrawn through 36, 36a is composed mainly of that fraction normally known as "tails" and contains the undesirable, poisonous fusel oil. The residue from the distillation in still 32 passes through overflow pipe 38 to receiver 39. It is composed to a large extent, say 40% to 50% or more, of aliphatic acids containing less than eleven carbon atoms. It contains not only those acids containing less than around four carbon atoms but particularly the higher aliphatic acids. This distillation residue, in view of its high content of the desired acids is satisfactory for reacting with the alcoholic distillate to provide the fatty acid esters which give to the products prepared according to this invention their improved body and flavor. Accordingly this residue is pumped by means of pump 40 through pipe 41 and into reaction chamber 14 as previously described.

Instead of withdrawing only a part of the vapors present in the lower part of the beer still, all of these vapors may be withdrawn at 11, provision being made if necessary for blanking off gas flow upwardly through column 1 immediately above the point of withdrawal. In this case the vapors withdrawn may be only fractionally condensed and condensate may be passed down a rectifying column such as the concentrator 32 so that water is evaporated and the desired acids are recovered as condensate. Water vapors are returned to column 1 at the plate just above the point of withdrawal as in the embodiment previously described.

Proportions are expressed in this application in terms of liquid volume percentages.

I claim:

1. In the manufacture of spirituous liquors by the distillation of a beer containing fatty acids in a continuous column still wherein the beer flows downwardly in the column countercurrent to a rising current of aqueous vapors and is distilled to a residual slop and alcoholic distillate vapors are produced containing around 50% alcohol, the improvement which comprises removing a part of the distillate in vapor form from the column still at a point where acids are near their maximum vapor concentration and intermediate the introduction of the beer and withdrawal of slop, subjecting said distillate to a fractional distillation treatment so as to obtain a liquid acid concentrate containing aliphatic acids having more than four and less than eleven carbon atoms in the acid molecule and freed from fusel oil and the major part of the water contained in the distillate, and refluxing said alcoholic distillate in intimate association with said acid concentrate.

2. The method of producing a whiskey of fine body, flavor, and aroma requiring a relatively short aging period, which method comprises continuously distilling a fermented grain mash to produce therefrom a distillate vapor containing at least 50% alcohol and an aliphatic acid concentrate comprising acids present in the fermented mash and having between 4 and 11 carbon atoms in the acid molecule, esterifying the acids in said concentrate to produce ethyl esters thereof, vaporizing said esters into said alcoholic distillate vapor, and condensing said vapor containing said esters blended therewith.

3. The method of producing a potable spirit of the group, whiskey, brandy, and rum, of fine body, flavor, and aroma, which method comprises continuously distilling the fermentation product from which said spirit is derived to produce therefrom a distillate vapor containing at least 40% alcohol and an aliphatic acid concentrate comprising acids present in the fermentation product and having between 4 and 11 carbon atoms in the acid molecule, esterifying the acids in said concentrate to produce ethyl esters thereof, vaporizing said esters into said alcoholic distillate vapor, and condensing said vapor containing said esters blended therewith.

4. In the manufacture of spirituous liquors by the distillation of a beer containing fatty acids in a continuous column still wherein the beer flows downwardly in the column countercurrent to a rising current of aqueous vapors and is distilled to a residual slop and alcoholic distillate vapors are produced containing around 50% alcohol, the improvement which comprises removing a fatty acid concentrate from the column still at a point where acids are near their maximum concentration and intermediate the introduction of the beer and the withdrawal of the slop, subjecting said concentrate to a fractional distillation treatment so as to further concentrate the aliphatic acids therein and form an aliphatic acid product containing acids having more than four and less than eleven carbon atoms in the acid molecule and free from fusel oil and the major part of the water contained in the concentrate removed from the column, esterifying the acids in said product to produce ethyl esters thereof, and blending the resultant esters with said alcoholic distillate.

FREDERICK GARTHEWAITE RING.